United States Patent [19]

Vivio

[11] Patent Number: 5,717,894
[45] Date of Patent: Feb. 10, 1998

[54] METHOD AND APPARATUS FOR REDUCING WRITE CYCLE WAIT STATES IN A NON-ZERO WAIT STATE CACHE SYSTEM

[75] Inventor: Joseph A. Vivio, Austin, Tex.

[73] Assignee: Dell USA, L.P., Round Rock, Tex.

[21] Appl. No.: 502,473

[22] Filed: Jul. 14, 1995

Related U.S. Application Data

[63] Continuation of Ser. No. 206,999, Mar. 7, 1994, abandoned.
[51] Int. Cl.[6] .................................................. G06F 13/28
[52] U.S. Cl. .................................. 395/465; 395/855
[58] Field of Search ................................ 395/445, 465, 395/466

[56] References Cited

U.S. PATENT DOCUMENTS

| | | | |
|---|---|---|---|
| 5,097,532 | 3/1992 | Borup et al. | 395/471 |
| 5,119,485 | 6/1992 | Ledbetter et al. | 395/473 |
| 5,303,364 | 4/1994 | Mayer et al. | 395/467 |
| 5,307,473 | 4/1994 | Tsuboi et al. | 395/470 |
| 5,325,499 | 6/1994 | Kummer et al. | 395/470 |
| 5,325,503 | 6/1994 | Stevens et al. | 395/473 |
| 5,325,504 | 6/1994 | Tipley et al. | 395/455 |
| 5,327,545 | 7/1994 | Begun et al. | 395/460 |
| 5,355,467 | 10/1994 | MacWilliams et al. | 395/473 |
| 5,359,723 | 10/1994 | Mathews et al. | 395/449 |
| 5,369,753 | 11/1994 | Tipley | 395/449 |
| 5,513,143 | 4/1996 | McClure | 365/195 |

OTHER PUBLICATIONS

Intel; 82385 High Performance 32-Bit Cache Controller; Oct. 1987; pp. 2-11 Order No.: 290143-002.
Chi-Hung Chi et al.; Improving Cache Performance by Selective Cache Bypass; System Sciences, 1989 Annual Hawaii Int'l. Conference. vol. I; 1989; pp. 277-285.

*Primary Examiner*—William M. Treat
*Assistant Examiner*—Kenneth R. Coulter
*Attorney, Agent, or Firm*—Henry N. Garrana; Mark P. Kahler; Diana L. Roberts

[57] ABSTRACT

A method and apparatus which enhances computer system performance in systems that incorporate a cache system that requires a first non-zero number of wait states and a memory system write buffer that requires a second lesser number of wait states. The present invention reduces or eliminates wait states that are otherwise required during write cycles in prior art designs without adding cost. During burst writes to data entries cached in the second level cache system, a cache protocol is used whereby the cache controller snoops the respective addresses which are the target of the burst write cycle out of the cache system, i.e., marks the respective cache line invalid. This effectively eliminates the data from the cache at the beginning of the burst write cycle. Since the data has now been marked invalid, the cache line is not required to be updated. Thus, the second level cache system effectively behaves as a write through cache system on these bursted writes, and the bursted writes pass through the cache system directly to the zero wait state write buffer in the memory controller. Therefore, the present invention increases system performance by reducing the write latency and thus improves the overall memory bandwidth of the processor.

9 Claims, 3 Drawing Sheets

METHOD AND APPARATUS FOR REDUCING WRITE CYCLE WAIT STATES IN A NON-ZERO WAIT STATE CACHE SYSTEM

This is a continuation of application Ser. No. 08/206,999, filed Mar. 7, 1994, now abandoned.

FIELD OF THE INVENTION

The present invention relates to cache memory systems in computer systems, and more particularly to a method for reducing or eliminating wait states during write cycles to a non-zero wait state cache system by eliminating write cycle updates to the cache system and instead utilizing a write buffer in the memory controller.

DESCRIPTION OF THE RELATED ART

Modern computer systems are required to manipulate and store increasingly larger amounts of code and data. One method that is commonly used to speed up memory accesses in computer systems is to utilize what is referred to as cache memory. A cache memory is a small amount of very fast, expensive memory that is interposed between a device which regularly requests data and a storage device. For example, the most common type of cache memory is referred to as a microprocessor cache memory. The microprocessor cache memory is interposed between the microprocessor and main memory and stores frequently used code and data. When a microprocessor requests data and the data resides in the cache, then a cache hit occurs and the data is provided back to the microprocessor without requiting the extra delay, measured in terms of one or more wait states, of a main memory access. If the requested data does not reside in the cache, then a cache miss occurs, and the microprocessor then must retrieve the requested data from slower main memory.

Cache management is usually performed by a device referred to as a cache controller. The cache controller determines the organization of the cache memory as well as the write policy that is enforced. For example, a cache memory may be organized as either a direct mapped cache or a set associative cache. The write policies enforced by a cache controller are generally referred to as either write-through or write-back. In a write-through cache, on a write hit the data is updated in both the cache memory and in main memory simultaneously. In a write-back cache, the updated data is only written back to main memory when the need arises, such as when another device requests this data from main memory. Data that has been updated in a write-back cache system but has not yet been updated in main memory is often referred to as dirty data.

Many modern computer systems include two levels of cache memory systems to further increase memory system performance. The first level cache system, also referred to as the primary cache system, is often integrated into the microprocessor chip. For example, the Intel i486 processor includes an on chip 8 kbyte first level cache that is configured as a write through cache. The Intel Pentium microprocessor includes two separate on chip caches for code and data. The second level cache system interfaces between the first level cache system and the memory system to further increase computer performance and is typically much larger than the first level cache system. When the microprocessor requests data and the data resides in the first level cache, then a first level cache hit occurs, and the data is immediately provided back to the microprocessor without requiring access to either the second level cache system or main memory. If the requested data does not reside in the first level cache, then the request is passed on to the second level cache system. If the data resides in the second level cache system, then the second level cache provides the data to the microprocessor without requiring a main memory access. If the requested data does not reside in either of the first or second level caches, then a main memory access is necessary to obtain the data.

In some computer system designs, the cache memory is comprised of synchronous static RAM (SRAM), and microprocessor reads from either of the first or second level cache systems occur in zero wait states. However, many low cost designs utilize asynchronous SRAM, and in these designs the respective cache system often requires one or more wait states for read and write cycles. In other words, when a processor write occurs and the data resides in the respective cache system, the CPU is required to add wait states on the write cycle because the cache system cannot be updated without adding wait states.

A computer system with a first level write-back cache typically bursts writes to the memory system when the processor must remove a dirty cache line. In prior art computer systems where the second level cache system requires wait states on write cycles, the CPU is required to add wait states to the bursted write cycles when that cache line also resides in the second level cache.

Other prior art systems which include a second level cache system that requires wait states will always add wait states during bursted write cycles because of the possibility that the cache line may reside in the second level cache.

Many computer systems also include a memory controller that includes a zero wait state write buffer which does not require wait states during CPU write cycles. In computer systems which include both a non-zero wait state cache system and a zero wait state write buffer, the presence of the cache system actually decreases performance on some cycles because a write that would otherwise occur in zero wait states to the write buffer in the memory controller requires one or more wait states to update the respective line in the cache system.

Therefore a method and apparatus is desired which enhances computer system performance by reducing wait states in systems which include a cache system that requires a first non-zero number of wait states and a memory controller write buffer that requires a second lesser number of wait states.

SUMMARY OF THE INVENTION

The present invention comprises a method and apparatus which enhances computer system performance in systems that incorporate a cache system that requires a first non-zero number of wait states and a memory system write buffer that requires a second lesser number of wait states. The present invention reduces or eliminates wait states that are otherwise required during write cycles in prior art designs without adding cost.

In the preferred embodiment of the invention, the computer system includes a CPU with a first level cache, a main memory system, and a second level cache system coupled between the CPU and the main memory system. The second level cache system requires a first non-zero number of wait states, and the memory system includes a write buffer that requires zero wait states. The first level cache is a write-back cache and often bursts writes to the memory system when the CPU must remove a dirty cache line from the cache.

During bursted writes to data entries cached in the second level cache system, a cache protocol is used whereby the cache controller snoops the respective addresses which are the target of the burst write cycle out of the cache system, i.e., marks the respective cache line invalid. This effectively eliminates the data from the cache at the beginning of the burst write cycle. Since the data has now been marked invalid, the cache line is not required to be updated. Because the CPU's dirty data is the most recent copy of this cache line, there is no need to retrieve any dirty data from the second level cache. Thus, the second level cache system effectively behaves as a write through cache system on these bursted writes, and the bursted writes pass through the cache system directly to the zero wait state write buffer in the memory controller. According to this new cache protocol of the present invention, the system only updates the second level cache on single writes, i.e., writes that are designated with a write-through policy.

In the preferred embodiment, cache protocol logic is included in the cache controller which receives respective signals from the CPU and determines when a bursted write cycle from the first level cache system is occurring. The cache protocol logic 302 also determines if the addresses of the burst cycle are cached in the second level cache memory. If so, the cache protocol logic invalidates the respective cache line in the second level cache memory. Thus, the data on the burst write cycle passes directly to the zero wait state write buffer in the memory controller, increasing system performance. Therefore, the present invention increases system performance by reducing the write latency and thus improves the overall memory bandwidth of the processor.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
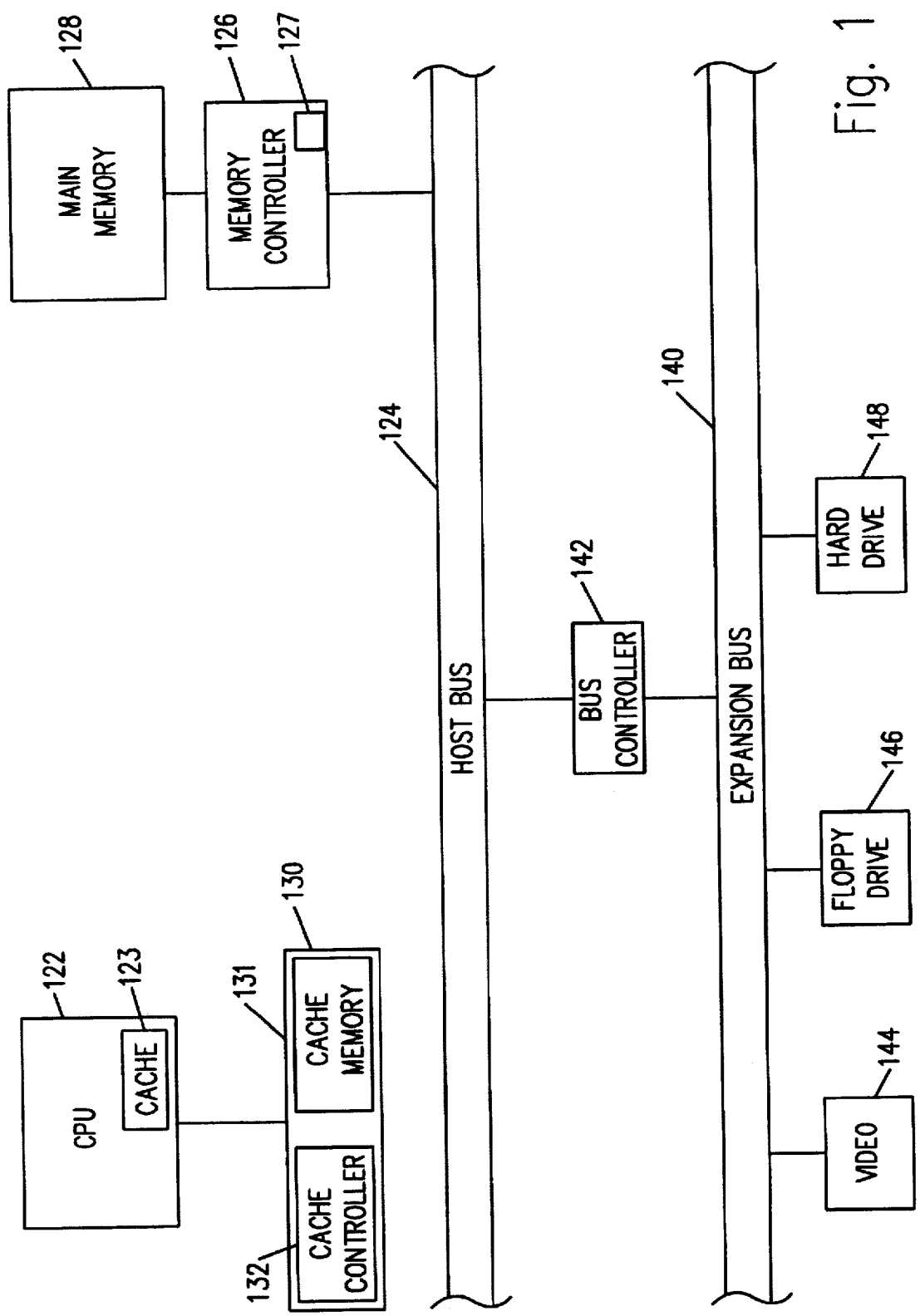
FIG. 1 is a block diagram of a computer system according to one embodiment of the present invention.

Referring now to FIG. 1, a computer system incorporating logic according to the present invention is shown. The elements of a computer system not necessary to understand the operation of the present invention have been omitted for simplicity. The computer system includes a central processing unit or CPU 122 which is coupled to a memory or host bus 124. The CPU 122 preferably includes an internal first level cache system 123 that is configured as a write-back cache. In the preferred embodiment the CPU 122 is an Intel Pentium microprocessor, although it is noted that other processors may be used. The computer system also includes a second level cache subsystem 130 coupled between the CPU 122 and host bus 124. The second level cache subsystem 130 comprises cache memory 131 and a cache controller 132. The second level cache memory 131 is preferably comprised of asynchronous static RAM (SRAM) and requires a first non-zero number of wait states, i.e., one or more wait states, during write accesses. The cache controller 132 also includes cache protocol logic according to the present invention which reduces the number of wait states required during write accesses, as described below.

The host bus 124 includes address, data, and control portions. Main memory 128 is coupled to the host bus 124 by means of memory controller 126. The memory controller 126 includes a write buffer 127 which stores write data and requires a second number of wait states, where this second number is less than the first number of wait states required by the second level cache system. In the preferred embodiment, the second number is 0, i.e., the write buffer 127 performs writes in zero wait states. The host bus 124 is coupled to an expansion or input/output (I/O) bus 140 by means of a bus controller 142. The expansion bus 140 includes slots for various other devices, including video 144, a floppy drive 146 and hard drive 148.

In the preferred embodiment using a Pentium processor, the first level cache system 123 includes separate code and data cache memories. The code cache is configured as a write-through cache and the data cache is configured as a write back cache. Each cache line in the first level cache system data cache includes 32 bytes of data which correspond to four addresses worth of data. When the CPU 122 is required to replace a dirty line in the first level data cache with new data, the cache system 123 bursts writes, i.e., performs burst write cycles to the main memory 128. These burst write cycles will include the four contiguous addresses corresponding to the data in the cache line being removed.

Figure 2:
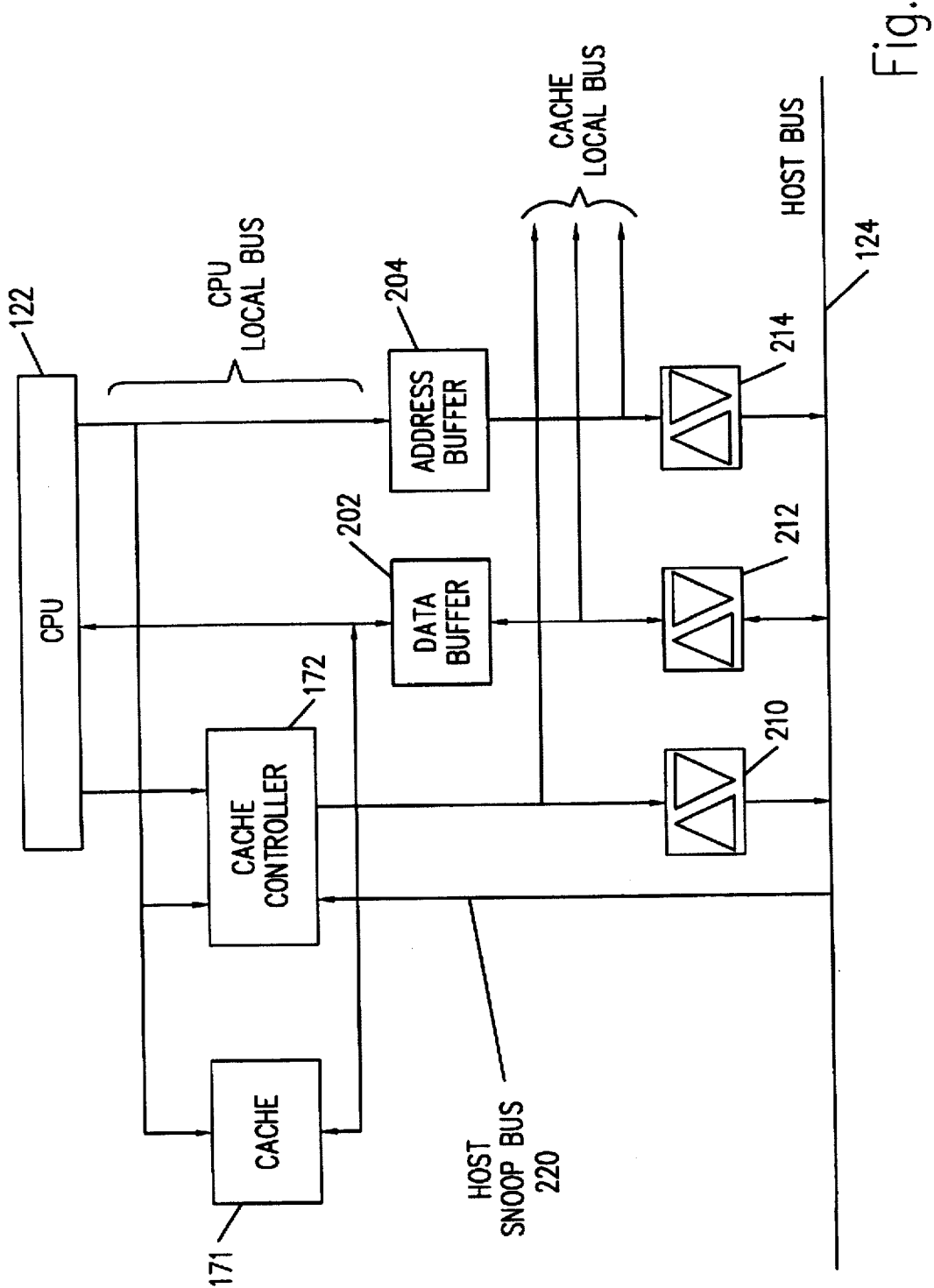
FIG. 2 is a more detailed block diagram of the second level cache system of FIG. 1.

Referring now to FIG. 2, a more detailed block diagram illustrating the second level cache system interface between the CPU 122 and the host bus 124 according to one embodiment of the present invention is shown. As shown, the CPU 122 includes data and address paths which connect to a data buffer 202 and address buffer 204, respectively. The data buffer and address buffer 202 and 204 are coupled to respective transceivers 212 and 214, which in turn are coupled to the host bus 124. The CPU 122 also includes a control path which is coupled to the cache controller 132. The address path of the CPU 122 is also coupled to both the cache 131 and the cache controller 132, as shown. The cache memory 131 includes a data path which is coupled to the data buffer 202. The cache controller 132 includes various control signals that couple through a transceiver 210 to the host bus 124. The cache controller 132 also includes a host snoop bus 220 coupled to the host bus 124 which is used to snoop memory cycles on the host bus 124, as is well known in the art.

As discussed in the prior art section, in many computer system designs the second level cache system requires one or more wait states for write cycles, and the memory controller will include a write buffer which requires a second, lesser number of wait states, typically zero wait states. Also, a computer system with a write back primary cache system occasionally bursts writes to the memory system when the processor must remove a dirty cache line. In such prior art systems it is necessary to add wait states onto the bursted write cycles when that cache line also resides in the second level cache system because the second level cache system cannot be updated without wait states. These wait states are added even though the memory controller write buffer does not require wait states. In the present invention, cache protocol logic 302 (FIG. 3) according to the invention is included in the second level cache controller 132 which operates to eliminate wait states during these burst write cycles without added cost. In the preferred embodiment, the cache protocol logic 302 snoops or invalidates the respective addresses from the second level cache memory 131, thus eliminating the data from the cache memory 131. Thus the second level cache system 130 is not required to be updated, and the associated wait states are not required to be inserted into the write cycle.

Figure 3:
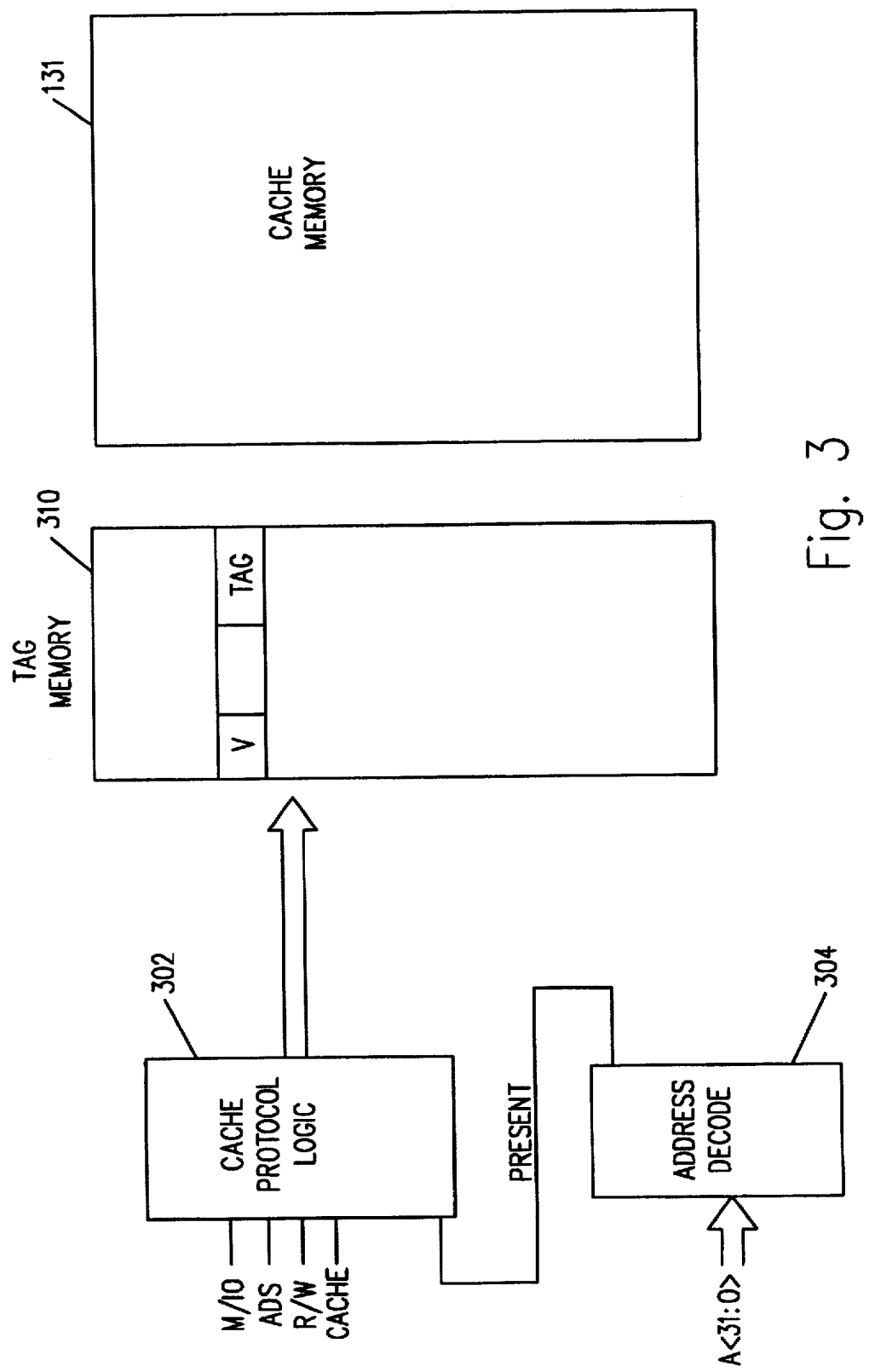
FIG. 3 illustrates cache controller protocol logic according to one embodiment of the invention.

Referring now to FIG. 3, a more detailed block diagram illustrating a portion of the logic in the cache controller 132, including the cache protocol logic 302 according to the present invention, is shown. As is well known in the art, in many cache configurations the cache memory is logically partitioned into a plurality of blocks, wherein each block includes a plurality of cache lines. As mentioned above, each cache line in the cache memory 131 stores 32 bytes of data which corresponds to four contiguous addresses in the main memory 128. The cache controller 132 preferably includes internal cache directory memory, also referred to as tag memory 310, that includes a number of directory entries corresponding to data entries stored in the cache memory 131. Each block of data in the cache memory 131 includes an associated tag directory entry that includes a respective tag address as well as one or more respective line valid bits which indicate whether or not the corresponding line in the cache memory 131 is valid, i.e. contains valid data. Each tag memory directory entry may also include various other miscellaneous status bits, as is well known in the art. It is noted that other types of cache system configurations may be used, as desired.

The cache protocol logic 302 receives various signals output from the CPU 122 and invalidates respective lines in the second level cache memory 131 to reduce and/or eliminate wait states during certain burst write cycles according to the present invention. As shown, the cache protocol logic 302 receives CPU signals referred to as M/IO, ADS*, R/W, and CACHE*. An asterisk following a signal indicates that the signal is asserted when it has a logic low value. The M/IO indicates whether a cycle is a memory cycle or an I/O cycle. The ADS* signal is asserted low to indicate that a cycle is beginning and that an address has been output from the pins of the CPU 122. The R/W signal indicates whether a cycle is a read cycle or a write cycle. The CACHE* signal indicates whether a respective address being generated on the address pins of the CPU 122 is a cacheable address. The cache controller 132 also includes address decode logic 304 which receives the 32 address lines from the CPU 122 referred to as A[31:0] and checks the tag memory 310 to determine if data corresponding to a respective address resides in the second level cache memory 131. The address decode logic 304 outputs a signal referred to as PRESENT, which is provided to the cache protocol logic 302. The cache protocol logic 302 is coupled to the tag memory 310 and invalidates a respective cache line if the first level cache system 130 bursts write cycles that correspond to data that is cached in the second level cache system, i.e., bursts write cycles including addresses which correspond to data that also reside in the respective cache line of the second level cache 130.

When the M/IO signal is asserted and the R/W signal is negated on a new cycle, indicating a memory write cycle, and the CACHE* signal is not asserted, indicating that the respective address is a cacheable address, then the data being output from the CPU 122 will almost certainly be a dirty line being removed from the first level cache system 123. If this is the case, the write cycle output from the CPU 122 will be a burst write cycle involving 32 bytes of data from the dirty cache line being removed from the first level cache. In other words, this burst write cycle will comprise four addresses and the corresponding 32 bytes of data from the respective first level cache line being replaced. When the cache protocol logic 302 detects such a cycle, the cache protocol logic 302 uses the PRESENT signal from the address decoder logic 304 to determine if this data also resides in the second level cache system 130. If so, the cache protocol logic 302 clears the valid bit in the respective tag location in the tag memory 310 corresponding to that line in the second level cache memory 131.

One other possibility when a memory write cycle occurs and the CACHE* signal is asserted is that the write is a single write (a non-bursted write). This occurs when data has been designated as write-through data, i.e., the respective write cycle has been designated with a write-through policy. One example of this is self-modifying code where the write occurs to the first level write-through code cache and is simultaneously written to the second level cache 130. In the case of a single write, the cache protocol logic 302 could either allow the write data update to occur in the second level cache 130, which would require one or more wait states, or the cache protocol logic 302 could invalidate the respective second level cache line where this data resides, as in the burst write situation. In the case where the second level cache system 130 requires one wait state for each write cycle, an invalidation in this instance only results in a saving of one clock cycle. In the preferred embodiment, single writes are invalidated like bursted writes. However, in an alternate embodiment, single writes are allowed to update the second level cache 130, and only bursted writes result in invalidations.

Thus, when the cache controller 132 receives the first address corresponding to a burst write cycle from the CPU 122, and this data also resides in a second level cache line, the cache protocol logic 302 operates to invalidate this entry in the cache memory 131, and thus the second level cache memory 131 is not required to be updated. Accordingly, the wait states associated with the second level cache system 130 are not required to occur, and the data corresponding to these four addresses can be transferred directly to the write buffer 127 in the memory controller 126, which requires a second, lesser number of wait states. To illustrate the advantages of the present invention, assume that the second level cache system 130 requires one wait state for each write update. In this instance, the second level cache system 130 would require three clock cycles for the first update to the cache line in the burst write cycle with two more clock cycles required per update for each of the remaining writes (3-2-2-2), thus requiring a total of nine clock cycles to update a burst of four write cycles. The three clock cycles for the first cycle of the burst write cycle comprise one clock cycle for the beginning address, a second clock cycle for the data transfer, and a third clock cycle for the wait state inserted by the second level cache system 130. The remaining three accesses of the burst transfer require only two clock cycles because they merely involve a data transfer and the insertion of a wait state by the second level cache system 130. The present invention eliminates the necessity of the second level cache system to be updated on such a burst write cycle and thus the total number of clock cycles is reduced. The present invention reduces the number of cycles to two clock cycles for the first update and one clock cycle for each of the remaining updates (2-1-1-1). The two clock cycles for the first cycle of the burst write cycle comprise one clock cycle for the beginning address of the burst and a second clock cycle for the data transfer to the zero wait state write buffer 127 in the memory controller 126. The remaining three accesses of the burst transfer require only one clock cycle each because they only involve a data transfer performed directly to the zero wait state write buffer 127.

Therefore, the present invention essentially makes the second level cache system 130 appear as a write through cache system during write updates which would otherwise require wait states. Thus the present invention increases system performance by improving write latency, as well as the overall memory bandwidth of the processor. It is also noted that the present invention may lower the second level cache hit rate due to the cache invalidations which are required, and this may lower system performance to some extent. However, the improved write access times are believed to outweigh this possible reduction in system performance due to the potentially lower cache hit rate.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A computer system with reduced write cycle wait states, comprising:

a CPU;

a cache system electrically coupled to said CPU that requires a first number of wait states to perform write cycle updates from said CPU;

main memory electrically coupled to said cache system; and a memory write buffer, associated with, and for storing data to be written to, said main memory, wherein said memory write buffer is electrically coupled to said cache system and said main memory, wherein write operations are performed to said write buffer in a second number of wait states, wherein said second number is less than said first number, wherein said cache system selectively disables at least a subset of write accesses to said cache system from said CPU, wherein the subset of write accesses involve addresses which match addresses of data cached in said cache system, wherein the cache system disables the subset of write accesses by invalidating respective cache lines in the cache system whose addresses match the addresses involved in the subset of write accesses, wherein the disablement forces said write accesses to bypass said cache system and proceed to said write buffer;

wherein said subset of write accesses occur to said memory write buffer in said second number of wait states, wherein said second number of wait states is less than said first number of wait states required by said cache system.

2. The computer system of claim 1, wherein said cache system includes cache memory, and wherein said cache system invalidates entries in said cache memory corresponding to said subset of write accesses.

3. The computer system of claim 1, wherein said cache system comprises a cache controller and cache memory, wherein said cache controller comprises:

tag memory comprising entries corresponding to lines in said cache memory;

cache protocol logic coupled to said tag memory and said CPU which determines when a write cycle from said CPU is occurring to said cache system that corresponds to data cached in said cache system, wherein the cache protocol logic invalidates the respective cache line where said data resides if said write cycle corresponds to data cached in said cache system.

4. The computer system of claim 1, wherein said cache system is a second level cache system and the CPU further comprises a first level cache system coupled to said second level cache system;

wherein said CPU generates burst write cycles from said first level cache system to said second level cache system;

wherein the second level cache system includes cache protocol logic that determines when a burst write cycle is occurring to the second level cache system that corresponds to data cached in the second level cache system, wherein the cache protocol logic invalidates the respective cache line where said data resides if said write cycle corresponds to data cached in the second level cache system.

5. The computer system of claim 1, wherein said second number is 0.

6. A method of reducing write cycle wait states in a computer system comprising a CPU, a cache system electrically coupled to said CPU that requires a first number of wait states to perform write cycle updates, main memory electrically coupled to said cache system, and a memory write buffer, associated with, and for storing data to be written to, said main memory, said memory write buffer electrically coupled to said cache system and said main memory which performs write operations in a second number of wait states, wherein said second number is less than said first number, the method comprising:

determining when a write cycle from said CPU is occurring to said cache system;

determining if said write cycle involves an address which matches an address of data that is cached in said cache system;

selectively disabling said write cycle if the address involved in said write cycle matches the address of data in said cache system to force said write cycle to bypass said cache system and proceed to said write buffer, wherein said disabling includes invalidating cache lines in said cache system whose address matches the address involved in said write cycle; and the write cycle by passing the cache system and proceeding directly to the memory write buffer, wherein the write cycle is performed to the memory write buffer in the second number of wait states, wherein the second number of wait states is less than the first number of wait states required by the cache system.

7. The method of claim 6, wherein said disabling comprises invalidating a respective cache line in said cache system.

8. The method of claim 6, wherein said determining when a write cycle from said CPU is occurring comprises determining if a CPU burst write cycle is occurring to said cache system.

9. A computer system with reduced write cycle wait states, comprising:

a CPU;

a first level cache system electrically connected to the CPU;

a second level cache system electrically coupled to said first level cache system where the second level cache system requires a first number of wait states to perform write cycle updates from said CPU;

main memory electrically coupled to said second level cache system; and a memory write buffer, associated with, and for storing data to be written to, said main memory, wherein said memory write buffer is electrically coupled to said second level cache system and said main memory, wherein write operations are performed to said write buffer in a second number of wait states, wherein said second number is less than said first number, wherein said second level cache system selectively disables at least a subset of write accesses to said second level cache system from said CPU, wherein the subset of write accesses involve addresses which match addresses of data stored in the second level cache system, wherein the cache system disables the subset of write accesses by invalidating cache lines in said second level cache system whose addresses match the addresses involved in the subset of write accesses, wherein said disabling forces said subset of write accesses to bypass said second level cache system and proceed to said write buffer, wherein said subset of write accesses occur to said memory write buffer in said second number of wait states, wherein said second number of wait states is less than said first number of wait states required by said cache system.

* * * * *